US012071325B2

(12) United States Patent
Cambruzzi et al.

(10) Patent No.: US 12,071,325 B2
(45) Date of Patent: Aug. 27, 2024

(54) METHOD FOR FORMING A GUIDE STRUCTURE FOR GUIDING AN ELEVATOR CAR IN AN ELEVATOR SHAFT

(71) Applicant: Inventio AG, Hergiswil (CH)

(72) Inventors: Andrea Cambruzzi, Zürich (CH); Michael Geisshüsler, Sursee (CH); Daniel Meierhans, Sins (CH); Christian Studer, Kriens (CH); Julian Stähli, Meggen (CH)

(73) Assignee: INVENTIO AG, Hergiswil (CH)

( * ) Notice: Subject to any disclaimer, the term of this patent is extended or adjusted under 35 U.S.C. 154(b) by 157 days.

(21) Appl. No.: 17/905,657

(22) PCT Filed: Mar. 2, 2021

(86) PCT No.: PCT/EP2021/055106
§ 371 (c)(1),
(2) Date: Sep. 6, 2022

(87) PCT Pub. No.: WO2021/180510
PCT Pub. Date: Sep. 16, 2021

(65) Prior Publication Data
US 2023/0103326 A1 Apr. 6, 2023

(30) Foreign Application Priority Data
Mar. 12, 2020 (EP) .................................... 20162762

(51) Int. Cl.
*B66B 19/00* (2006.01)
*B66B 7/02* (2006.01)

(52) U.S. Cl.
CPC ............ *B66B 19/002* (2013.01); *B66B 7/024* (2013.01)

(58) Field of Classification Search
CPC ........... B66B 7/02; B66B 7/022; B66B 7/023; B66B 7/024; B66B 7/1269; B66B 11/0005; B66B 19/00; B66B 19/002
USPC ............................................................... 52/30
See application file for complete search history.

(56) References Cited

U.S. PATENT DOCUMENTS 2,067,094 A * 1/1937 Miles ...................... A47F 11/02 52/64
2,451,548 A * 10/1948 Groen ...................... B23C 3/00 409/118
4,122,685 A * 10/1978 Ruff ...................... E04F 17/005 52/30
(Continued)

FOREIGN PATENT DOCUMENTS

CN 2679119 Y 2/2005
CN 105293251 A * 2/2016 ............... B66B 7/00
(Continued)

*Primary Examiner* — Ryan D Kwiecinski
(74) *Attorney, Agent, or Firm* — William J. Clemens; Shumaker, Loop & Kendrick, LLP

(57) ABSTRACT

A method for forming a guide structure in an elevator shaft provides a guide structure configured to guide an elevator car during vertical travel in the elevator shaft. The method includes the following steps: moving a tool, such as a milling tool, vertically along the elevator shaft, wherein the tool is precisely positioned with respect to the horizontal position thereof within the elevator shaft, and forming the guide structure by removing material on a shaft wall of the elevator shaft using the tool.

13 Claims, 3 Drawing Sheets

(56) References Cited

U.S. PATENT DOCUMENTS 5,014,822 A * 5/1991 Chapelain ............ B66B 19/002 187/401
6,257,556 B1 * 7/2001 Park ......................... E04G 3/30 187/241
6,578,673 B2 * 6/2003 Barker .................... B66B 7/022 187/400
7,261,186 B2 * 8/2007 Deplazes ................ B60L 13/10 318/135
7,559,409 B2 * 7/2009 Barneman ............ B66B 19/002 187/408
8,186,130 B2 * 5/2012 Van Der Meijden ........................ B66B 19/002 52/741.1
10,766,744 B2 * 9/2020 Hägg ...................... B66B 19/00
11,027,945 B2 * 6/2021 Buetler ................. E04B 1/4107
11,111,109 B2 * 9/2021 Cambruzzi ............. B66B 19/00
11,186,464 B2 * 11/2021 Cambruzzi ............. B32B 37/12
11,242,227 B2 * 2/2022 Cambruzzi ......... B66B 11/0005
11,919,745 B2 * 3/2024 Weber ..................... B66B 19/00
2010/0287876 A1 * 11/2010 Van Der Meijden ........................ B66B 11/008 52/741.1
2012/0168263 A1 * 7/2012 Alois .................... B66B 19/002 52/745.03
2015/0128403 A1 * 5/2015 Valkama ............... B66B 19/002 29/281.6
2016/0152442 A1 * 6/2016 Weber ..................... B66B 19/00 187/359
2016/0311657 A1 * 10/2016 Kilpeläinen ............ B66B 19/06
2016/0311659 A1 * 10/2016 Mertala ................... E04G 3/246
2017/0066626 A1 * 3/2017 Yoshiyuki Hosoda ...................... B66B 7/1246
2018/0208439 A1 * 7/2018 Studer ................... B66B 19/002
2018/0319629 A1 * 11/2018 Talonen ................ B66B 5/0056
2018/0354753 A1 * 12/2018 Hägg ........................ E04G 5/14
2019/0112159 A1 * 4/2019 Cambruzzi ........... B66B 19/007
2019/0210839 A1 * 7/2019 Buetler ................. E04B 1/4107
2020/0377339 A1 * 12/2020 Cambruzzi .......... G01C 15/004
2021/0156666 A1 * 5/2021 Cambruzzi ............. B66B 19/00
2021/0198084 A1 * 7/2021 Kinjarapu ................. B66B 7/02
2022/0024723 A1 * 1/2022 Laitinen .................. B66B 7/026
2022/0080546 A1 * 3/2022 Cambruzzi ........... B66B 19/002
2022/0164488 A1 * 5/2022 Cortona ................ B66B 5/0087
2022/0185630 A1 * 6/2022 Weber ..................... B66B 19/00
2022/0194741 A1 * 6/2022 Scherzer ............... B66B 19/005
2022/0219945 A1 * 7/2022 Lanz ..................... B66B 19/002
2023/0103326 A1 * 4/2023 Cambruzzi ............. B66B 7/024 52/30
2023/0242374 A1 * 8/2023 Michel .................. B66B 5/0087 187/391
2023/0331519 A1 * 10/2023 Haag ..................... B66B 19/002

FOREIGN PATENT DOCUMENTS

CN 107848767 A 3/2018
CN 109733974 A 5/2019
CN 112079227 A * 12/2020
CN 112591580 A * 4/2021 ......... B66B 11/0005
CN 112591582 A * 4/2021 ......... B66B 11/0045
CN 115321306 A * 11/2022 ........... B66B 19/002
DE 202011107167 U1 * 2/2012 ............. B66B 7/024
DE 102011111297 A1 * 2/2013 ............. B66B 7/024
EP 2562120 A1 * 2/2013 ............. B66B 7/024
EP 2754632 A1 * 7/2014 ........... B66B 19/002
EP 3575259 A1 * 12/2019 ............. B66B 7/024
EP 3766820 A1 * 1/2021 ........... B66B 19/002
EP 3842373 A1 * 6/2021
ES 2505865 A1 * 10/2014 ............. B66B 7/023
FI 120089 B1 * 6/2009 ........... B66B 11/008
FR 2684086 A1 * 5/1993 ............... B66B 7/02
JP S6460587 A 3/1989
JP 2000118910 A 4/2000
JP 2001163546 A 6/2001
JP 2008207896 A * 9/2008
JP 2011116545 A * 6/2011
KR 9309009 B1 * 9/1993 ........... B66B 19/002
WO WO-2006010782 A2 * 2/2006 ........... B66B 19/002
WO WO-2012072860 A1 * 6/2012 ............. B66B 11/00
WO WO-2015003964 A1 * 1/2015 ............. B66B 19/00
WO WO-2016002042 A1 * 1/2016 ......... B66B 11/0005
WO 2016078726 A1 5/2016
WO WO-2017016780 A1 * 2/2017 ............. B66B 11/00
WO WO-2017016782 A1 * 2/2017 ............. B66B 11/00
WO WO-2017016783 A1 * 2/2017 ............. B66B 11/00
WO WO-2018002093 A1 * 1/2018 ......... B66B 11/0005
WO WO-2018050469 A1 * 3/2018 ......... B66B 11/0005
WO WO-2018095739 A1 * 5/2018 ........... B66B 19/002
WO WO-2020225203 A1 * 11/2020 ............. B66B 19/00
WO WO-2023223554 A1 * 11/2023
WO WO-2024033373 A1 * 2/2024
WO WO-2024033415 A1 * 2/2024

* cited by examiner

METHOD FOR FORMING A GUIDE STRUCTURE FOR GUIDING AN ELEVATOR CAR IN AN ELEVATOR SHAFT

FIELD

The present invention relates to a method, by means of which a guide structure along which an elevator car can be guided can be formed in an elevator shaft of an elevator system. The invention also relates to an elevator shaft comprising a guide structure formed according to the invention.

BACKGROUND

In an elevator system, an elevator car can typically be moved vertically within an elevator shaft. During its vertical movement, the elevator car is guided by one or more guide structures in order to prevent the elevator car from moving laterally away from an intended vertical travel path.

For this purpose, one or more guide rails are conventionally installed in the elevator shaft. The guide rails can be designed, for example, as steel profiles, in particular as profiles which are T-shaped, L-shaped, U-shaped or H-shaped in cross section. Such guide rails are typically prefabricated and then installed in the elevator shaft. For this purpose, individual guide rail segments are anchored to one of the shaft walls. Conventionally, brackets, which are also referred to as consoles, are usually attached to the shaft wall, for example by means of anchor bolts, and a relevant guide rail segment is fixed to the shaft wall by means of the braces.

In addition to anchoring the anchor bolts and attaching the brackets, a considerable amount of work and time is often required in this case in order to attach the guide rails in the elevator shaft in a positionally accurate manner and to adjust the guide rails so as to be aligned with one another.

A method of this kind is described in WO 2018/095739 A1, for example.

Various alternative approaches have been proposed in order to form guide structures for guiding an elevator car in an elevator shaft. For example, EP 2754632 A1 describes a method for forming elevator guide rails, in which the guide rails are formed using a molding machine in or adjacent to the elevator shaft. JP 2008-207896 describes an elevator in which grooves are formed as guide rails.

SUMMARY

There may be a need for a method for forming a guide structure in an elevator shaft which allows the guide structure to be formed relatively quickly, easily, precisely and/or inexpensively. There may also be a need for an elevator shaft in which such a guide structure has been formed.

Such a need can be met by the method or the elevator shaft according to any of the advantageous embodiments that are defined in the following description.

According to a first aspect of the invention, a method is proposed for forming a guide structure in an elevator shaft. In this case, the guide structure is configured to guide an elevator car during vertical travel in the elevator shaft. The method comprises moving a tool vertically along the elevator shaft and forming the guide structure by removing material on a shaft wall of the elevator shaft by means of the tool during the vertical movement of the tool along the elevator shaft. The tool is precisely positioned with respect to the horizontal position thereof within the elevator shaft.

According to a second aspect of the invention, an elevator shaft having a guide structure is proposed, the guide structure having been formed by means of a method according to an embodiment of the first aspect of the invention.

Possible features and advantages of embodiments of the invention can be considered, inter alia and without limiting the invention, to be based upon the concepts and findings described below.

As already briefly stated at the outset, an elevator car in conventional elevators is usually moved along guide rails which guide the elevator car along the vertical travel path thereof. The guide rails are installed as separate components in the elevator shaft. In this case, each guide rail is typically composed of a plurality of segments which are mounted above one another along the travel path and in alignment with one another on one of the walls of the elevator shaft. For this purpose, the guide rail segments are usually anchored in the wall of the elevator shaft using brackets.

The described conventional way of forming guide structures for guiding the elevator car in an elevator shaft using guide rails is associated with high financial expenditure and labor outlay and other disadvantages. For example, the guide rail segments have to be produced and then delivered to the elevator system location. In this case, the guide rail segments have to be adapted to the spatial conditions in the elevator system, in particular with regard to their geometry and especially with regard to their length. In order to mount the guide rail segments, suitable brackets or holders usually have to be anchored in the elevator shaft. For this purpose, a large number of bores are conventionally introduced in the walls of the elevator shaft, which requires considerable effort, in particular in very tall elevator shafts and in view of the fact that no elevator car to be moved within the elevator shaft is available at this point in time. The guide rail segments then have to be fixed to the respective elevator shaft walls by means of the brackets and aligned with one another. This also requires a considerable amount of work and, if necessary, has to be carried out at great heights within the elevator shaft.

In order to overcome the disadvantages mentioned or some of said the disadvantages, it is proposed to form the guide structure for guiding the elevator car in the elevator shaft using a new type of method.

The method can be configured such that it is possible to dispense with preceding manufacture and delivery of guide rails and assembly and adjustment of the guide rails. Instead, in the proposed method, the guide structures are produced directly in situ, i.e. by machining measures inside the elevator shaft.

In the proposed method, a special tool is successively moved vertically along the elevator shaft and is always precisely positioned with respect to the horizontal position thereof within the elevator shaft. In this case, i.e. during said the vertical movement of the tool along the elevator shaft, material on the shaft wall of the elevator shaft is removed by means of the tool and the guide structure is thus produced.

The tool can, for example, be moved from a lowermost point, at which the guide structure is to be provided in the elevator shaft in order to be able to move the elevator car to a lowest possible position within the elevator shaft, to an uppermost point to which the guide structure is to extend in the elevator shaft. In this case, the lowermost point can be arranged in the vicinity of a bottom of the elevator shaft, whereas the uppermost point can be arranged in the vicinity of a ceiling of the elevator shaft. In other words, a travel path along which the tool is moved during the method can at least approximately correspond to the travel path along which the guide structure to be formed is to later guide the elevator car.

In this case, the tool is structurally and functionally configured to remove material on the shaft wall of the elevator shaft. In particular, the tool should be able to remove material mechanically, for example by milling, grinding, planing, machining, etc. For example, the tool can be configured to remove material directly from the shaft wall. The material can thus be concrete. Alternatively, the tool can be configured to remove regions from a structure attached to the shaft wall that is made of a different material, such as metal, in particular steel, plastics material, wood or the like.

As the tool is moved vertically through the elevator shaft, the horizontal position thereof is always precisely monitored and controlled such that material at desired locations on the shaft wall is removed by means of the tool.

Accordingly, structures can be produced successively by removing material on the shaft wall by means of the tool, which structures are configured to be suitable as a guide structure for guiding the elevator car. The guide structure can thus in particular be designed as a groove extending in the vertical direction in or on the shaft wall. The guide structure can also be formed from a plurality of, in particular two, such grooves, which are preferably formed on opposing shaft walls. Such guide structures can, for example, extend along the elevator shaft. In particular, such guide structures can be linear and preferably extend vertically. The guide structures can have surfaces on which the elevator car can be guided during vertical travel thereof. These surfaces can preferably extend transversely to the horizontal, in particular perpendicularly to the horizontal.

Because the tool is moved vertically through the elevator shaft and removes material on the shaft wall of the elevator shaft in a horizontally precisely positioned manner, the guide structure can thus be produced in a relatively simple and/or quick operation. In contrast to the conventional formation of the guide structure by means of guide rails which are to be additively mounted in the elevator shaft, the guide structure is formed in this case by subtractive removal of material which is already present in the elevator shaft.

Since the tool can be monitored and suitably positioned with respect to the horizontal position thereof during the removal of material, the guide structure formed by the removal can be formed in a very locally precise manner and/or so as to extend almost perfectly vertically.

According to one embodiment, the movement of the tool and the positioning of the tool can be carried out completely automatically or at least partially automatically.

For example, the tool can be moved along the elevator shaft by means of a motor. Such a motor can, for example, drive a cable winch or the like, by means of which the tool can be raised and lowered within the elevator shaft. The motor and thus the movement of the tool can be controlled by means of a controller.

Furthermore, the tool can have an actuator system or can be moved using an actuator system. The tool can be moved in directions transverse to the horizontal, in particular in horizontal directions, by means of the actuator system.

The actuator system can work together with a sensor system. The sensor system can be configured to detect a current position of the tool within the elevator shaft, i.e. an absolute position of the tool or a position of the tool relative to other structures within the elevator shaft. Signals from the sensor system can be conducted to the actuator system. The actuator system can then position the tool precisely at a desired position in order to be able to remove material on the shaft wall there.

For example, the tool can be positioned within the elevator shaft using a robot or a similar machine which has an actuator system and a sensor system. The robot or the machine can then be moved vertically within the elevator shaft together with the tool.

The tool and optionally the robot or the machine can, for example, be part of an automated device as proposed by the applicant of the present application for carrying out other installations in an elevator shaft and as described, for example, in WO 2017/016783 A1.

According to one embodiment, the tool can have a milling head. In order to form the guide structure, a groove can then be produced vertically along the shaft wall by material being removed by means of the milling head.

In other words, the tool can be designed as a milling tool. A milling head of such a milling tool typically has a milling element which can be set in rotation by a motor and which has a structured or rough milling surface. The rotating milling element can then mechanically remove material on the shaft wall with the milling surface thereof. The milling element can be a milling disc, for example. The milling disc can be rotated about an axis of rotation which preferably extends horizontally and preferably extends in parallel with the shaft wall. Alternatively, the milling element can be a rotationally symmetrical body, for example, which is rotated about an axis of rotation extending transversely to the shaft wall, preferably orthogonally to the shaft wall.

By successively moving the tool with the milling head vertically along the elevator shaft, the milling head removes material on the shaft wall and thus forms a preferably linear and vertically extending groove. This groove can be used as a guide structure.

In particular, the groove can have lateral surfaces extending transversely to the shaft wall, along which, for example, a guide shoe attached to the elevator car can be guided. The lateral surfaces of the groove can extend perpendicularly to the surface of the shaft wall or obliquely or at an incline with respect to this surface. A cross section of the groove can be constant along the vertical extension of the groove. In other words, the lateral surfaces of the groove can be arranged at a constant distance and in a constant positioning relative to one another along the entire length of the groove.

According to a more specific embodiment, material can be milled from the shaft wall by means of the milling head.

In other words, in the proposed method, the milling head can be configured and arranged such that it can be used to remove material directly from the shaft wall. The material to be removed is therefore material which is already present in the elevator shaft, since it is part of the shaft wall thereof, so that no additional material needs to be brought into the elevator shaft in order to form the guide structure. This material is usually hard concrete, which is usually still strengthened with reinforcements. A groove can thus be milled in this concrete by means of a milling head suitably designed for this purpose, which groove can then be used as a stable guide structure for the elevator car.

During the milling of the groove, the tool or the milling head thereof can be guided such that, as far as possible, only concrete above the reinforcement is removed, so that the reinforcement is not damaged and the strengthening function thereof is not reduced. For example, the milling head can mill the groove with a maximum depth which is smaller than a thickness of a concrete cover layer over the reinforcement.

The groove can thus typically be milled to a depth of significantly less than 10 cm, for example a depth in the range from 1 cm to 5 cm.

According to one embodiment, a convex structure projecting from the shaft wall into an interior of the elevator shaft can be formed on the shaft wall in advance in the proposed method. The guide structure can then be formed by removing material from this convex structure by means of the tool.

In other words, before the tool is used, a convex projecting structure can be formed on the shaft wall of the elevator shaft, from which material can then be removed using the tool in order to form the guide structure. In the region of the convex structure, the shaft wall thus bulges, so to speak, toward the interior of the elevator shaft. The convex structure thus forms a region on the shaft wall in which, for example, a cover layer located over a concrete reinforcement is effectively locally thickened. The convex structure can, for example, project beyond adjacent regions of the shaft wall into the interior of the elevator shaft by a thickness of a few millimeters up to several centimeters, for example a thickness of 0.5 cm to 10 cm, preferably a thickness of 1 cm to 5 cm. In this case, the convex structure can have a rectangular, semi-circular or geometrically different cross section.

A groove, for example, can then be milled into this convex structure as a guide structure using the tool. In this case, the guide structure can only extend in the region of the convex structure or can extend deeper into a volume of the shaft wall that is located beneath the convex structure. Overall, the guide structure can thus be deeper, i.e. form larger guide surfaces, than would be the case if the guide structure were merely milled into a concrete cover layer over a reinforcement in the concrete forming the shaft wall.

According to a specific embodiment, the convex structure can be designed to be integrated with the shaft wall.

In other words, the shaft wall and the convex structure formed thereon can be integral. The shaft wall and the convex structure can consist of a common material, in particular concrete. A reinforcement provided in the concrete preferably does not extend into the convex structure. The convex structure can already be formed during the formation of the shaft wall, i.e. in particular when pouring the concrete to form the shaft wall. The shaft wall provided with the convex structure can thus be manufactured particularly easily.

Alternatively, according to one specific embodiment, the convex structure can be attached to the shaft wall at least partially as an addition.

In other words, the convex structure can be formed completely or at least partially by means of an additional component which is to be attached to the shaft wall subsequently, i.e. after the concrete has been poured. The originally preferably planar shaft wall can thus be locally thickened by means of the component forming the convex structure.

In this case, the convex structure can consist of the same material as the shaft wall or a different material to the shaft wall. For example, the convex structure can consist of concrete, but also of other materials such as plastics material, metal, wood, composite materials, etc. The convex structure can be composed of a plurality of component segments. The component segments can be arranged vertically above one another. In this case, the component segments only need to be oriented roughly in alignment with one another. The guide structure can then be subsequently introduced into the component segments which are roughly aligned, in particular by milling out a continuous groove along the plurality of component segments.

The convex structure to be additionally attached can be glued to the shaft wall, for example.

For this purpose, an adhesive mass can be applied in flowable form to a surface of the shaft wall and then solidified, for example. The adhesive can preferably be applied in an automated manner, for example by means of a robot which is to be moved vertically through the elevator shaft. The adhesive can adhere to the shaft wall in a materially bonded and/or form-fitting manner. The adhesive mass can be applied with a significant thickness, such that it can itself act as the convex structure after curing. Alternatively, an additional component or component segment forming the actual convex structure can be pressed onto the adhesive, such that this component or component segment is bonded to the shaft wall via the adhesive.

Alternatively or in addition, the convex structure can be screwed to the shaft wall.

For this purpose, for example, a separate component forming the convex structure can be fixed to the shaft wall by means of screws. In this case, it may be preferable to fix the component using a large number of small screws instead of a few large screws. The small screws can, for example, only be screwed into the concrete cover layer of the shaft wall, so that there is no risk of damaging the reinforcement underneath and problems when screwing in the screws can be prevented.

The component can preferably be screwed together automatically. For example, a robot specially designed for this purpose can be moved vertically through the elevator shaft and screw the component forming the convex structure or segments thereof to the elevator shaft wall.

According to one embodiment, a plastics layer can be subsequently applied to a running surface on the guide structure which was formed when the guide structure was formed.

In other words, a running surface can be produced on the guide structure which was formed by removing material on or in the shaft wall. A guide shoe of the elevator car, for example, can later roll or slide along this running surface. This running surface can be further processed to give it specific properties. In particular, the running surface can be subsequently provided with a plastics layer. The plastics layer can smooth the running surface. As a result, for example, a rolling resistance or sliding resistance can be reduced when the guide shoe is moved along the running surface. Alternatively or additionally, the plastics layer can seal the running surface and/or protect it against environmental influences. The plastics layer can be applied by machine. The plastics layer can in particular be applied fully automatically or partially automatically.

According to one embodiment, the tool can position its horizontal position within the elevator shaft relative to a vertical reference line provided in the elevator shaft.

In other words, the horizontal position of the tool within the elevator shaft can be determined by reference to a reference line. For example, the reference line can extend where the guide structure is to be produced on the elevator shaft wall. Alternatively, the reference line can extend in a predefined spatial relationship to the position where the guide structure is to be produced. The tool or a positioning device which interacts therewith can, for example, have a sensor system or a detector which can detect the reference line. After the reference line has been detected, the tool can then be precisely positioned relative to this reference line.

The reference line can be formed materially, i.e. implemented by a material structure provided within the elevator shaft. For example, the reference line can be implemented using a plumb line provided in the elevator shaft. Such a plumb line can have a weighted cord, for example, which thus extends vertically inside the elevator shaft. The plumb line can thus be used as a vertical reference line, so that the position of the tool can be determined relative to this plumb line.

Alternatively, the reference line can also be designed to be material-free. For example, the reference line can be designed to be purely visually perceptible. In particular, the reference line can be generated using a laser beam which is generated so as to extend in a straight line and preferably vertically in the elevator shaft. The laser beam can be detected and the position of the tool can be fixed relative to this laser beam.

An elevator shaft according to the invention, in which the guide structure was formed using an embodiment of the method presented here, can offer various advantages for the elevator system formed therewith in comparison to conventional elevator shafts. For example, the advantages of the method proposed herein which have already been described above also lead to analogous advantages for the elevator shaft. In particular, the advantage that the guide structure can be formed particularly quickly, precisely and/or inexpensively using the proposed method can lead to corresponding advantages for the elevator shaft. Furthermore, the possible positionally accurate formation of the guide structure can lead to the guide structure in the finished elevator shaft being able to be oriented in a straighter line and/or in a virtually precisely vertical manner in comparison to conventional guide rails constructed from a plurality of segments. As a result, travel comfort for the elevator car guided on the guide structure can be improved, inter alia. A space requirement for the guide rail within the elevator shaft can also be omitted or reduced, in particular if the guide structure is designed as a groove on or in one of the shaft walls. As a result, the cross section of the elevator shaft that is available for the elevator car can be enlarged.

Finally, it is noted that, in addition to the embodiment described in detail above, in which the guide structure is produced by milling a groove, other removal methods using the position-guided tool are also conceivable. For example, the tool can be used to remove material from a structure which was previously only roughly predefined, in particular a structure projecting convexly from the shaft wall, in order to form planar, vertical surfaces on this structure, which surfaces can then be, for example, running surfaces of the desired guide structure.

It should be noted that some of the possible features and advantages of the invention are described herein with reference to different embodiments of the method according to the invention and the elevator shaft to be formed therewith. A person skilled in the art will recognize that the features can be suitably combined, adapted or replaced in order to arrive at further embodiments of the invention.

Embodiments of the invention will be described below with reference to the accompanying drawings; neither the drawings nor the description should be interpreted as limiting the invention.

The drawings are merely schematic and not to scale. Like reference signs denote like or equivalent features in the various drawings.

DETAILED DESCRIPTION

Figure 1:
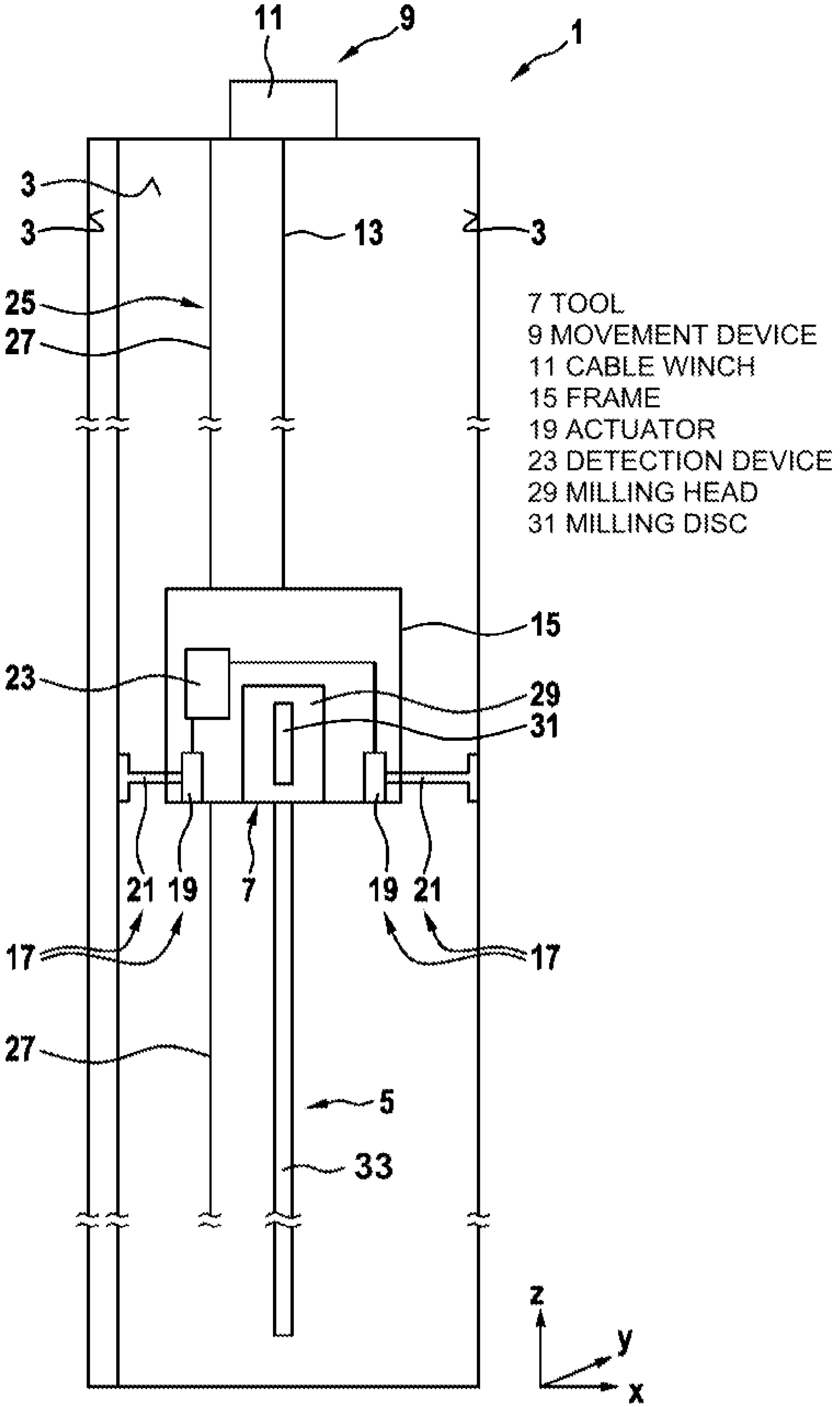
FIG. 1 shows an elevator shaft in which a guide structure is formed by means of a method according to an embodiment of the present invention.

FIG. 1 shows an elevator shaft 1. The elevator shaft 1 is formed by a substantially cuboid volume which is formed in a building and is laterally delimited by shaft walls 3. In this case, the shaft walls 3 extend vertically, i.e. in a z-direction. The elevator shaft 1 is delimited at the top and bottom by a ceiling and a floor, respectively, which extend horizontally, i.e. in a plane spanned by an x-direction and a y-direction.

An elevator car (not shown) is to be moved vertically in the elevator shaft 1 at a later point in time. In this case, the elevator car is to be guided on one or more guide structures 5 within the elevator shaft 1.

In order to form such a guide structure 5 in the elevator shaft 1, a tool 7 can be received in the elevator shaft 1 according to embodiments of the method described herein. In this case, precautions are taken in order to be able to move the tool 7 vertically within the elevator shaft 1 and at the same time position the tool precisely with regard to the horizontal position thereof within the elevator shaft 1. The tool 7 is in this case configured to form the desired guide structure 5 in the form of a vertically extending groove on one of the shaft walls 3 by removing material there during the vertical movement within or along the elevator shaft.

In order to implement these functionalities, as illustrated in a simplified manner in the embodiment shown in FIG. 1, a movement device 9 can be provided, for example, which is configured to raise or lower the tool 7 vertically along the elevator shaft 1 in a controlled manner. Such a movement device can be, for example, a cable winch 11 which can wind and unwind a cable 13 in order to move a frame 15 or car attached to one end of the cable 13 within the elevator shaft 1. The tool 7 can be held on or in the frame 15 or car.

A lateral position of the tool 7 or of the frame 15 holding the tool can be influenced by means of a positioning device 17. For this purpose, the positioning device 17 can have, for example, an actuator system having actuators 19, by means of which rams 21 can be moved in the horizontal direction. A plurality of actuators 19 and rams 21 can be provided, which can be moved in different directions in order to be able to move the lateral position of the tool 7 or the frame 15 overall in the x-direction and/or the y-direction. The actuators 19 and rams 21 can possibly also be configured and operated such that they can be used to support the tool 7 or the frame 15 on opposite lateral walls 3 and thus to brace and fix the tool or frame within the elevator shaft 1.

A detection device 23 is also provided. The current lateral position of the tool 7 or of the frame 15 within the elevator shaft 1 can be detected by means of the detection device 23. For this purpose, the detection device 23 can detect, for example, a vertical reference line 25 provided in the elevator shaft 1, the position and/or orientation or course of which within the elevator shaft 1 are known. The reference line 25 can be formed by a plumb line 27 installed in the elevator shaft 1, for example. Detection signals from the detection device 23, which indicate where the tool 7 is currently located relative to the reference line 25, can be transmitted to the positioning device 17, so that the positioning device can then laterally move the frame 15 with the tool 7 attached thereto into a desired target position.

Both the movement of the tool 7 using the movement device 9 and the lateral positioning of the tool 7 using the positioning device 17 can be carried out in a fully automated or at least partially automated manner. For this purpose, for example, partial controllers of the movement device 9, the positioning device 17 and possibly the tool 7 itself can communicate with one another or be coordinated by a central controller.

In order to be able to remove material on a shaft wall 3 in a targeted manner using the tool 7, the tool can be configured as a milling tool, for example. For example, the tool 7 can have a milling head 29 on which a milling disc 31 is provided. The milling disc 31 can be circular, for example, and can be driven in rotation. In this case, the tool 7 corresponds to or resembles a slot cutter or wall chaser.

By moving the tool 7 with its rotating milling disc 31 vertically through the elevator shaft 1 while keeping the lateral position thereof precisely at a lateral target position, i.e. moving the tool along a desired vertical line through the elevator shaft, for example, the milling disc 31 can cut the material from the shaft wall 3 or from a structure provided on the shaft wall 3. In this way, a preferably linearly extending groove 33 can be produced on the shaft wall 3.

A mechatronic installation component can also be arranged on the frame, for example in the form of an industrial robot, which can pick up and guide the tool. In this case, the frame can be positioned and fixed at different heights in the elevator shaft, the tool, in the fixed state, being moved along a shaft wall in such a way that the guide structure is formed by removing material on the shaft wall.

Figure 2:
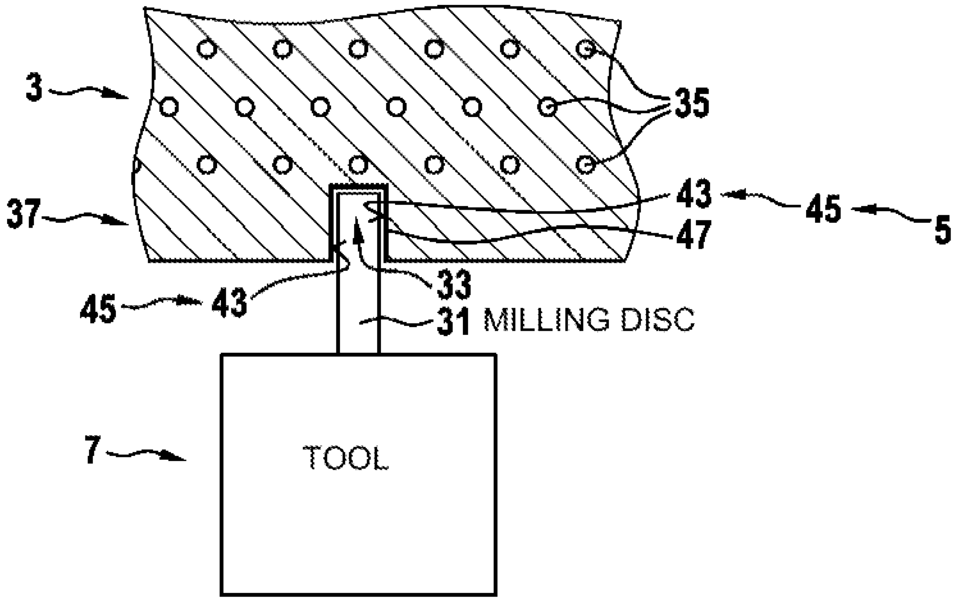
FIG. 2 is a sectional view through a guide structure formed according to the invention.

FIG. 2 is a horizontally sectional view through the tool 7 and the groove 33 produced in the shaft wall 3 by means of the tool. The milling disc 31 removes material directly from the shaft wall 3. The shaft wall 3 is typically made of concrete in which reinforcements 35 are embedded. The reinforcements 35 are typically covered by a concrete cover layer 37 a few centimeters thick. When forming the groove 33, the tool 7 can preferably be positioned such that the groove 33 extends sufficiently deeply into the shaft wall 3, but the reinforcements 35 located under the concrete cover layer 37 are not damaged.

Figure 3:
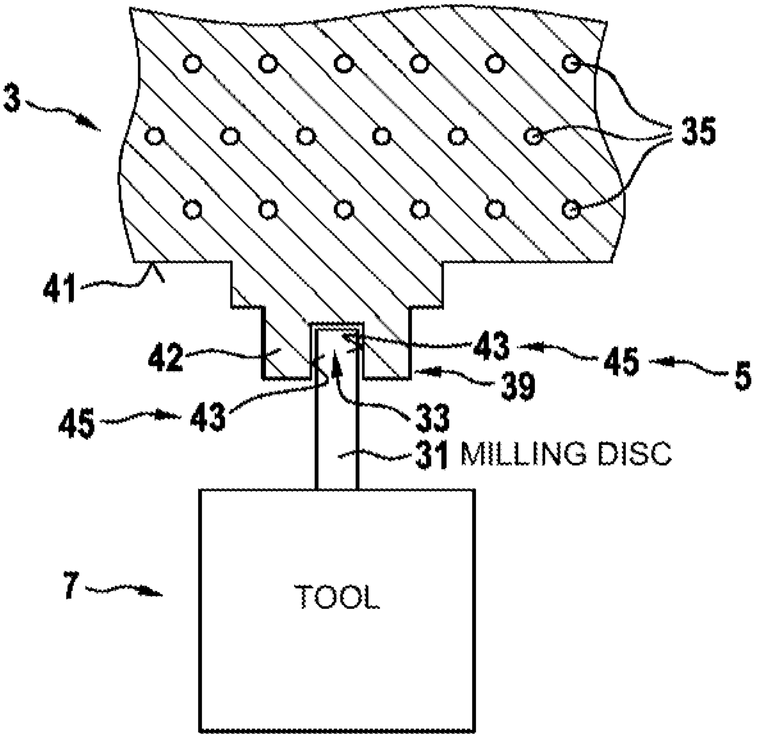
FIG. 3 is a sectional view through an alternative guide structure formed according to the invention.

An alternative embodiment for forming the groove 33 on the shaft wall 3 is shown in FIG. 3. In this embodiment, the tool 7 does not mill material directly out of the shaft wall 3. Instead, a convex structure 39 projecting into an interior of the elevator shaft 1 is provided on the shaft wall 3. The convex structure 39 can have an approximately rectangular cross section, for example. The convex structure 39 can protrude a few centimeters beyond a planar surface 41 of the shaft wall 3, for example. Material can then be removed from this convex structure 39 by means of the tool 7. In this way, for example, a vertically extending groove 33 can be produced in the convex structure 39. In this case, the groove 33 can extend more precisely, i.e. for example straighter and/or more accurately in accordance with the vertical, than is the case for the convex structure 39.

As shown in FIG. 3, the convex structure 39 can be formed directly during the formation of the shaft wall 3 together with said the shaft wall. For example, when the shaft wall 3 is cast with concrete, the convex structure 39 can also be cast. In this case, the convex structure 39 can be integrated with the shaft wall 3.

Figure 4:
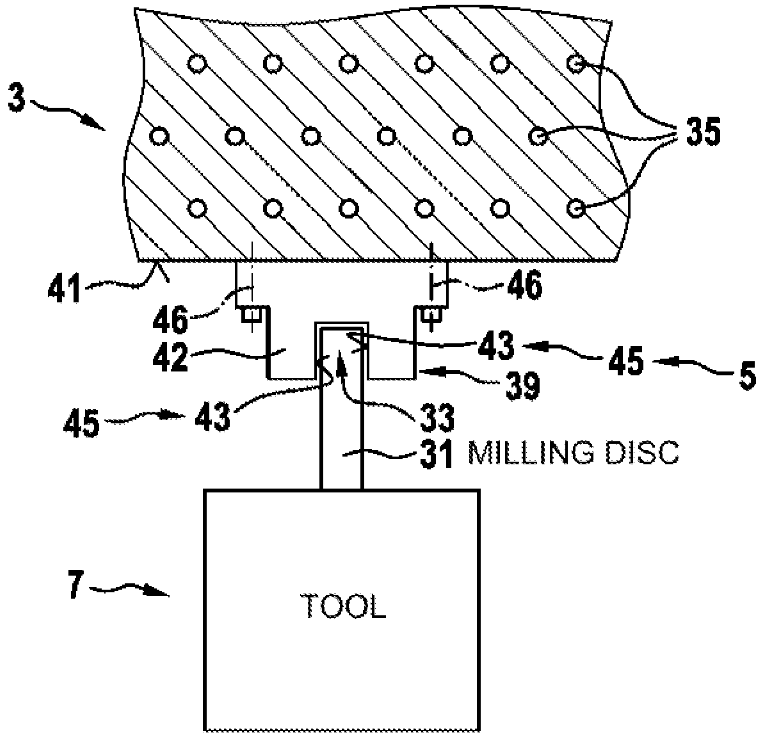
FIG. 4 is a sectional view through the alternative guide structure that has been added to the shaft wall after completion according to the invention.

Alternatively, as shown in FIG. 4, the convex structure 39 can have been added to the shaft wall 3 only after it has been completed. For this purpose, the convex structure 39 can be formed, for example, by means of a plurality of component segments 42 which are rectangular in cross section. The component segments 42 can be fixed to the shaft wall 3. For example, the component segments 42 can be screwed to the shaft wall 3 using a large number of relatively small screws 46. Alternatively or additionally, the component segments 42 can be glued to the shaft wall 3. A plurality of such component segments 42 can be fixed to the shaft wall 3 vertically above one another, for example along substantially the entire length of the elevator shaft 1, in order to overall form the convex structure 39 extending vertically along the shaft wall 3.

The groove 33 formed in the shaft wall 3 or in the convex structure 39 can later be used as a guide structure 5 for guiding the elevator car. In this case, for example, a roller of a guide shoe provided on the elevator car can roll in the groove 33 and be guided by the mutually opposing lateral flanks 43 of the groove 33.

In order to smooth, harden and/or protect a running surface 45 of a guide structure 5 formed in this way from abrasion, for example, the running surface 45 can be protected by means of a plastics layer 47 (see FIG. 2). The running surface 45 can be formed, for example, by a base and/or the flanks 43 of the groove 33. The plastics layer 47 can also have damping properties. For example, the plastics layer can be a few 100 μm up to a few millimeters thick. The plastics layer can be applied, for example, directly after the groove 33 has been milled. A suitable application device can be provided on the tool 7 for this purpose. Alternatively, the plastics layer can be applied using a separate device and/or at a different point in time.

Finally, it should be noted that terms such as "comprising," "having," etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for forming a guide structure in an elevator shaft, the guide structure being configured to guide an elevator car during vertical travel of the car in the elevator shaft, the method comprising the steps of:

moving a tool vertically along the elevator shaft while the tool is in a predetermined horizontal position within the elevator shaft; and forming the guide structure by removing material on a shaft wall of the elevator shaft using the tool during the vertical movement of the tool along the elevator shaft.

2. The method according to claim 1 including automatically performing the moving of the tool and positioning of the tool in the predetermined horizontal position.

3. The method according to claim 1 wherein the tool has a milling head and a groove is produced vertically along the shaft wall by removing the material using the milling head.

4. The method according to claim 3 wherein the milling head has a milling disc and the material is milled out of the shaft wall by milling disc.

5. The method according to claim 1 including a convex structure projecting from the shaft wall into an interior of the elevator shaft, and wherein the guide structure is formed by removing the material from the convex structure using the tool.

6. The method according to claim 5 including forming the convex structure on the shaft wall during formation of the shaft wall.

7. The method according to claim 6 wherein the convex structure is integrated with the shaft wall.

8. The method according to claim 5 including adding the convex structure to the shaft wall by attachment.

9. The method according to claim 8 including gluing the convex structure to the shaft wall.

10. The method according to claim 8 including screwing the convex structure to the shaft wall.

11. The method according to claim 1 including applying a plastics layer to a running surface formed on the guide structure.

12. The method according to claim 1 including positioning the tool in the predetermined horizontal position within the elevator shaft relative to a vertical reference line provided in the elevator shaft.

13. The method according to claim 12 wherein the reference line is a plumb line provided in the elevator shaft.

* * * * *